United States Patent [19]

Homma

[11] Patent Number: 4,919,177

[45] Date of Patent: Apr. 24, 1990

[54] METHOD OF TREATING TI-NI SHAPE MEMORY ALLOY

[76] Inventor: Dai Homma, Room C-103, Mezon-yokohamanohkendai, 12-72, Horiguchi, Kanazawa-ku, Yokohama-shi, Kanagawa-ken, Japan

[21] Appl. No.: 174,949

[22] Filed: Mar. 29, 1988

[30] Foreign Application Priority Data

Mar. 30, 1987 [JP] Japan .................................. 62-73982

[51] Int. Cl.$^5$ .............................. C22F 1/00; C22F 1/10
[52] U.S. Cl. .................................... 148/133; 148/402; 420/417
[58] Field of Search ....................... 148/131, 133, 402; 420/417

[56] References Cited

U.S. PATENT DOCUMENTS

| | | | |
|---|---|---|---|
| 3,594,239 | 7/1971 | Wang .................. | 148/133 |
| 3,953,253 | 4/1976 | Clark .................. | 148/402 |
| 4,631,094 | 12/1986 | Simpson et al. ....... | 148/402 |
| 4,707,196 | 11/1987 | Honma et al. .......... | 148/402 |
| 4,740,253 | 4/1988 | Simpson et al. ....... | 148/402 |
| 4,747,887 | 5/1988 | Honma ................. | 148/402 |

OTHER PUBLICATIONS

Touminen et al., Jour. of Metals, Feb. 1988, pp. 32–35.

Primary Examiner—Upendra Roy

[57] ABSTRACT

A method of treating a Ti-Ni shape memory alloy to improve their various characteristic properties. In a first step of the method, a wire of the shape memory alloy is held at a high temperature within a predetermined range to be turned into a solid solution, and thereafter, cooled, whereby plastic strain in it is removed and crystals of the alloy are grown. In a second step of the method, current pulse is passed through the wire to rapidly heat it to a temperature higher than its $M_f$ point to cause elongation due to transformation superplasticity to it. In a third step of the method, the application of the pulse is stopped, the wire is rapidly cooled to the temperature of its $M_f$ point or below, and tensile load is applied to the wire immediately after the stop of the application of the pulse to cause elongation to the wire again in a cooling process, and thereafter the load is removed or sufficiently decreases to stop the deformation when the value of m concerning the wire is sharply decreased. Then, the second and the third steps are repeated a required number of times.

5 Claims, 1 Drawing Sheet

METHOD OF TREATING TI-NI SHAPE MEMORY ALLOY

BACKGROUND OF THE INVENTION

1. Field of the Invention

This invention relates to a method of treating a Ti(-titanium)-Ni(nickel) shape memory alloy to improve various characteristic properties thereof.

2. Description of the Prior Art

A shape memory alloy formed of a Ti-Ni alloy with about 1:1 composition ratio of Ti to Ni is a substance called an intermetallic compound which has metallic bonding but exhibits properties similar to those of covalent bonding. In this Ti-Ni shape memory alloy, there occur various phenomena such as martensitic transformation, precipitation and oxidation in a very complicated way, whereby it is difficult to detect each of its phases exactly. In consequence, different views on the transformations of the alloy have been expressed by various researchers, and no satisfactory heat treatment method for the Ti-Ni shape memory alloy has been established yet.

In general, a Ti-Ni shape memory alloy commercially available, which is normally wire-shaped, has been obtained as follows. An ingot of the Ti-Ni shape memory alloy is hot worked into a rough shape at a high temperature of 800° to 1000° C., and thereafter, cold working and stress relief annealing are alternately repeated, to thereby make the ingot gradually approach a predetermined shape. This is because the Ti-Ni shape memory alloy exhibits high work-hardening, whereby it is difficult to carry out cold working such as wire drawing. The Ti-Ni shape memory alloy worked into a wire, etc. through the above-described processes is supplied to users in a hardened state after the final cold working.

The following three types of methods have heretofore been known as the treatment for giving a required shape to the shape memory alloy material in the hardened state as described above.

The first method is the one wherein the material supplied in a work-hardened state is further cold worked into a required shape, and thereafter, held at a temperature of 400° to 500° C. for about 15 minutes to 1 hour with its shape being restrained.

The second method is the one wherein the material is held at a temperature of 800° C. or above for a predetermined period of time, rapidly cooled so that the structure thereof is normalized, thereafter, cold worked into a predetermined shape, and held at a temperature of 200° to 300° C. with its shape being restrained.

The third method is the one wherein the material is heated at a temperature close to 1000° C. to become perfectly a solid solution, thereafter, quenched, and aging-processed at a temperature of about 400° C. This method is utilized only for a Ti-Ni alloy with a Ni concentration of more than 50.5%.

In general, the shape memory alloy given a certain configuration (shape or length) by one of the above-described methods has heretofore been used so that deformation thereof may not exceed 2% (if number of repetitions are particularly large, the deformation should be specifically 0.5% or less ) and the highest heated temperature may be rather low, i.e. its $A_f$ point +60 degrees or less. In practice, in order to extract a larger deformation through smaller strain, in most cases, the shape memory alloy has been used in a coil spring-like shape and heated indirectly through fluid such as air or water.

When deformation-shape restoration process is applied repeatedly under proper conditions to the alloy which is given a certain configuration by one of the above-described methods, as the number of repetitions is increased, the alloy comes to be stable in shape and smooth in movement. In general, this phenomenon is called learning effect, and sometimes utilized positively as a process for training the shape memory alloy. However, this training requires a considerable number of repetitions, and moreover, as the number of repetitions increases, plastic strain is generated and accumulated gradually in the alloy, thus presenting such problems that the range of motion of the alloy is reduced, and fatigue fracture is brought about.

Further, when the Ti-Ni shape memory by one of the above-described methods is heated by electric current passed therethrough, the wire tends to be overheated to lose the memory of the given configuration and to be broken. For example, when the Ti-Ni alloy wire is used in an actuator of type where the alloy is given tension and heated by electric current passed therethrough, the alloy gradually loses the memory of the given length, whereby length adjustment of the wire is frequently needed.

Now, in general, specific characteristic properties of crystalline materials are based on the phenomena in crystal grains of the materials. Accordingly, in many cases, these specific characteristic properties should naturally be most remarkably recognized when the materials are of single crystal. For this reason, when the excellent properties or functions of some material are to be utilized, in general, the best results can be obtained at the time the material is of single crystal. However, in practice it is extremely difficult to industrially produce the material of single crystal, and the production, even when achieved, should be very expensive. In consequence, most of materials, which have heretofore been actually used, are polycrystalline materials which can be easily produced, and in general, orientations of the respective crystals thereof have been random. The Ti-Ni shape memory alloy is no exception on this matter.

With polycrystalline materials which have the above-described random crystal orientations, including the Ti-Ni shape memory alloy, "the excellent characteristic properties or functions" cannot be extracted to the utmost as with single-crystal materials from the following reasons.

(A) The above-described "excellent characteristic properties or functions" are not exhibited at grain boundaries or thereabout.

(B) In general, "the excellent characteristic properties or functions" do not equally appear in all of the directions, but appear to the utmost in a specific direction depending on the orientation of the respective crystal. However, since the crystal orientations are random, "the excellent characteristic properties or functions" cannot be extracted to the utmost in any directions, in view of the material as a whole.

SUMMARY OF THE INVENTION

However, the inventor of the present invention has found that, even with polycrystalline materials, in general, when the crystal orientations are arranged properly, the excellent characteristic properties and functions can be extracted to a larger extent and more effectively, and that this fact is applicable to the polycrystalline materials of the Ti-Ni shape memory alloy, and when the crystal orientations in the alloy are arranged properly, the aforesaid disadvantages can be obviated.

The present invention has been developed on the basis of the above-described knowledge, and has as its object the provision of a method of treating a Ti-Ni shape memory alloy, wherein crystal orientations of the Ti-Ni alloy can be re-arranged in a specific direction.

Another object of the present invention is to provide a method of treating a Ti-Ni shape memory alloy, wherein the Ti-Ni shape memory alloy is stabilized in its shape in a short period of time, and the remembered shape is not easily lost even if repeated motions accompanied with a large deformation (about 4% in elongation) are performed.

Further object of the present invention is to provide a method of treating a Ti-Ni shape memory alloy, wherein fatigue life of the Ti-Ni shape memory alloy for the repeated motions accompanied with a large deformation (about 4% in elongation) can be lengthened.

A still further object of the present invention is to provide a method of treating a Ti-Ni shape memory alloy, wherein, even when heated to a high temperature, the alloy loses less the memory of the given configuration, and moreover, the same tendency is obtained even when the alloy is under load.

A still more further object of the present invention is to provide a method of treating a Ti-Ni shape memory alloy, wherein the Ti-Ni shape memory alloy has a characteristic property of easily operating in a direction of the treatment or a tensile direction (this means that, in the direction, a force required for the deformation is much lower than the shape restoring force).

A yet further object of the present invention is to provide a method of treating a Ti-Ni shape memory alloy, wherein the operating efficiency of the Ti-Ni shape memory alloy is improved when the alloy is to perform periodical motions.

A yet more further object of the present invention is to provide a method of treating a Ti-Ni shape memory alloy, wherein physical properties of the alloy, within a scope where superelasticity is observed, come to vary less, i.e. the properties can be stabilized, even when the alloy receives repeated deformations.

In accordance with the above objects, the present invention in a method of treating a Ti-Ni shape memory alloy includes the following steps of:

(a) holding a wire of the Ti-Ni shape memory alloy at a high temperature within a predetermined range to turn the alloy into a solid solution, and thereafter, cooling the wire, whereby plastic strain in the wire is removed and crystals of the alloy are grown;

(b) passing current pulse through the wire to rapidly heat the wire to a temperature higher than its $M_f$ point (preferably to its $M_d$ point or above) to cause elongation due to transformation superplasticity to the wire (this phenomenon of transformation superplasticity will be described in detail hereunder);

(c) stopping the application of the pulse, rapidly cooling the wire to the temperature of its $M_f$ point or below, applying tensile load immediately after the stop of the application of the pulse to cause elongation again in a cooling process of the wire, and removing or sufficiently decreasing the tensile load to stop the deformation when the value of m with regard to the wire is sharply decreased; and (d) repeating the aforesaid steps (b) and (c) a required number of times.

According to the present invention, the crystal orientations are rearranged along with the direction of stress field where the Ti-Ni alloy is placed, i.e. the direction of the tensile load. A mechanism, through which the crystal orientations of the Ti-Ni alloy are rearranged by the treating method according to the present invention, is not yet satisfactorily made clear. However, when the treatment according to the present invention is carried out, the phenomenon of the transformation superplasticity (which is also called dynamic superplasticity) appears simultaneously, whereby, it is presumed that the mechanism, through which the rearrangement of the crystal orientations of the Ti-Ni alloy is performed according to the present invention, is closely associated with the phenomenon of the superplasticity.

At present, the inventor of the present invention presumes that the rearrangement of the crystal orientations as described above takes place as follows. Along with the occurrence of the phenomenon of the transformation super plasticity due to the heat cycle, the crystal grain boundaries come into a state where slips and deformations occur easily, and moreover, the energy field (tensile load) acts thereon, whereby the respective crystal grains rotate in a direction along the direction of the energy field. Detailed description of this presumption will be made in detail hereunder.

BRIEF DESCRIPTION OF THE DRAWINGS

The foregoing and other objects, features and advantages of the present invention will become apparent from the following detailed description when taken in connection with the accompanying drawings. It is to be understood that the drawings are designed for the purpose of illustration only and are not intended as a definition of the limits of the invention.

DESCRIPTION OF THE PREFERRED EMBODIMENT

Theoretical Discussion

Figure 1:
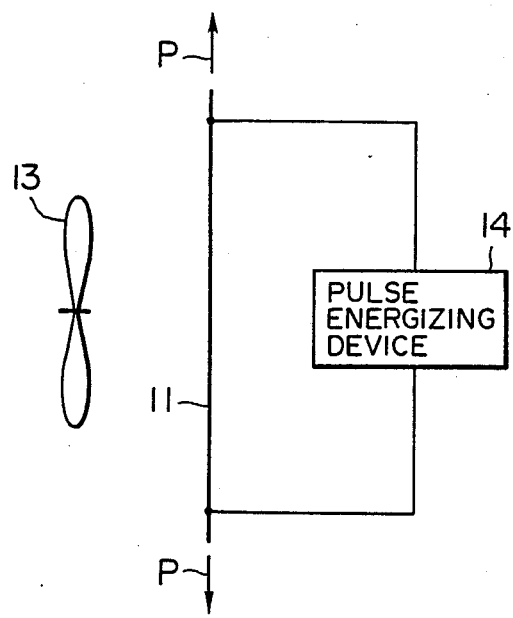
FIG. 1 is a schematic diagram showing one preferred embodiment of the present invention.

To make the present invention easily understood, the phenomenon of the transformation superplasticity will be described first.

The transformation superplasticity is such a phenomenon that, under a low stress in which no deformation seems to be present in the ordinary state, when a dynamic heat cycle or a heat strain cycle which rises and drops over the transformation range are applied to a material, a huge scale deformation occurs to the material while the material passes through the transformation range.

As for superplasticity, there has been known ultra fine grain superplasticity besides the transformation superplasticity. The ultra fine grain superplasticity, however, can be recognized only in certain special alloys, whereas, the transformation superplasticity has a possibility of occurring with almost all of the materials having a transformation point in solid phase (recently, it has been clarified that the transformation superplasticity occurs not only with the metals but also with ceramics and synthetic resins).

In general, when a material is deformed, the relationship between stress and strain rate is represented by the following equation.

$$\sigma = K \epsilon^m \quad (1)$$

where
- $\sigma$ is the deformation stress;
- $\epsilon$ is the strain rate;
- K is a constant, and, when m=1, the equation (1) becomes the Newton equation of viscous flow and K=$\eta$ becomes a coefficient of viscosity; and
- m is the strain rate sensitivity index (which is normally called the value of m and given by the slope of the deformation stress-versus-strain rate curve plotted on log-log coordinates.

It has been known that, in the case of normal plastic deformation, m=0.03−0.1, whereas, in the case of the super plasticity including the transformation superplasticity, m≧, which is closer to the viscosity behavior of Newtonian fluid rather than the metal.

It has been ascertained through studies in recent years that, slips between the crystal grains and fracture of the crystal grains, which are caused by movements of dislocations of the crystal grins, are the main causes of the normal plastic deformation, whereas, in the transformation super plasticity, the deformation is developed by the rotations and the like of the crystal grains, which are caused by the slips, deformations and the like at the grain boundaries and therearound without changes of the crystal grains themselves. When the crystal grains rotate even slightly, deformation of a fairly large scale takes place in the material as a whole.

Now, according to the present invention, a specific heat cycle is given to the Ti-Ni shape memory, and it is considered that the heat cycle should be the one to bring the material into a state where the transformation superplasticity can occur. Therefore, the heat cycle should be the one which rises and drops over the transformation region of the Ti-Ni shape memory alloy (to say more precisely, it is preferable that the heat cycle is concentrated only on the grain boundaries as will be discussed in more detail hereunder).

In most cases, when the superplasticity is to be utilized in practice, the primary purpose is deformation working and methods of heating and cooling are not so important. According to the present invention, however, control of the internal structure of the material is the purpose, whereby the heating process in the heat cycle becomes particularly important, so that a care must be taken to the followings when heating is carried out.

(i) Each of the crystal grains is considered to be a material of single crystal having good properties, and it is undesirable to give thermal damages to it. Furthermore, when improper heating is performed, the crystal grains, which have rotated into a good direction, possibly cause recrystallization in an undesirable direction.

(ii) As described above, according to the present invention, it is presumed that the crystal orientations are rearranged by the rotations of the crystal grains which are caused by slips, deformations and the like at the grain boundaries and therearound without changes of the crystal grains themselves. Therefore, if only the grain boundary portions are intensively exposed to the heat cycle, this phenomenon can be made to take place more effectively.

In the present invention, as the heating method to satisfy the requirements of the above-described items (i) and (ii), direct heating by current pulse is used. In the polycrystalline material, generally speaking, at the grain boundaries atoms are positioned at random, presenting a state close to an amorphous state, whereby electric resistance is high, whereas, within the grains atoms are regularly arranged, whereby electric resistance is considered to be low. Therefore, in the direct heating by current pulse, it becomes possible to intensively heat the grain boundaries when the current pulse is controlled to be as short as possible in its ON period and as high as possible in its voltage so that the largest possible current passes during its ON period to increase the heating rate (This to be discussed in more detail later). However, such rapid heating as to cause inner breakage of the material should be avoided.

Incidentally, when a continuous current is passed through the material, heat transfer from the grain boundaries to the interior of the grains is increased, thereby it becomes difficult to intensively heat the grain boundaries.

DETAILS OF THE PREFERRED EMBODIMENT

A preferred embodiment of the present invention will now be described hereunder with reference to the accompanying drawings.

The Ti-Ni shape memory alloy used in this preferred embodiment has a slightly more content of Ti than the standard content of 50–50 at %. When the Ti content is excessively high, the material loses the characteristic properties as a shape memory alloy or superelastic alloy. The Ti content can be found by examining the martensitic transformation point of the alloy, and in general, such tendency is exhibited that the higher the Ti content is, the higher the transformation point becomes. In the Ti-Ni shape memory alloy used here, the Ti content is adjusted so that the $A_f$ point may become 100° C. or above. The Ti-Ni shape memory alloy used in this preferred embodiment is formed into a wire by hot and cold workings. The hot working is carried out in an atmosphere of inactive gas, vacuum or the like in order to avoid oxidation, nitriding and the like which exert bad influence on the mechanical properties of the wire. Specific treatments in this preferred embodiment will hereunder be described.

In this preferred embodiment, the Ti-Ni alloy is treated in accordance with the following steps (I) to (IV).

Step (I):

First, the wire 11 of the Ti-Ni shape memory alloy is held at a temperature of about 800° to 1000° C. in a furnace to be turned into a solid solution, thereafter, cooled to remove the plastic strain from the wire, and the crystals of the alloy are made grown. At this time, the holding time and the cooling rate are changed to control the growth of the crystal grains.

The size of the crystal grain as referred to here is measured relative to the diameter of the wire 11 after completion of the treatment. It is desirable that, the thicker the diameter of the wire after completion of the treatment is, the larger the crystal grain is. There is such tendency that, with the same sectional area, the larger the crystal grain is, the better becomes the shape stability of the material after completion of the treatment (the reason for this will be described hereunder).

Step (II):

Continuous current pulse is passed through the wire 11, adjusted in crystal grain size as described above, from a pulse energizing device 14 to rapidly heat the wire 11 to the temperature of its $M_f$ point or above (preferably, its $M_d$ point or above) with the tensile load applied to the wire 11 as shown in FIG. 1. The tensile stress by the aforesaid tensile load is preferably set at about 100 MPa. With this arrangement, elongation deformation due to the transformation superplasticity is caused to the wire 11, and along with the elongation the sectional area of the wire 11 is gradually decreased.

Step (III):

Subsequently, the application of the pulse is stopped, and the wire 11 is forcedly air-cooled by a fan 13 or the like to be rapidly cooled to the temperature of its $M_f$ point or below at a cooling rate of 20 to 100 K/s or above. Furthermore, immediately after the stop of the supply of the pulse, the tensile load is increased to about 200 MPa. Then, the elongation deformation occurs again in a process during which the wire is cooled, and along with this, the sectional area of the wire 11 is gradually decreased. At this time also, a phenomenon that the value of m, the strain sensitivity index becomes 0.3 or above is observed. Then, in due time, the wire 11 becomes abruptly softened and the value of m becomes abruptly low. Then, the tensile load is removed or made satisfactorily low (100 MPa or below, for example) to thereby stop the deformation. A point at which a stress-strain curve abruptly rises during deformation coincides with the time at which the value of m is abruptly decreased. If the cooling rate is selected to be lower than the aforesaid rate, excellent results can not be obtained.

Step (IV):

Subsequently, the above-described Steps (II) and (III) are repeated several times or scores of times.

Then, every time these steps are repeated, the crystal orientations come to be arranged in the direction of the tensile load. In the beginning, it is recognized that, every time the Steps (II) and (III) are repeated, deformation of about 5 to 20% calculated in terms of the tensile strain is observed. However, when the diameter of the wire 11 is reduced to some extent relative to the size of the crystal grain, permanent deformation becomes difficult to take place. When such state is reached, the treatment is completed. If the above-described treatment is further continued, then the crystal grains are fractured at the grain boundaries, emitting sparks during heating.

There are very many unclear points about the mechanism through which the crystal orientations come to be arranged properly when the heat cycle and the field of stress are applied to the Ti-Ni shape memory alloy as in the present invention. However, the inventor of the present invention presumes, at present, the mechanism to be described below.

First, at a stage where Step (I) is completed, the crystal orientations in the wire 11 of the Ti-Ni shape memory alloy are random, and accordingly, it is considered that the directions, in which deformation of the respective crystal is easily made due to the superelasticity, are also distributed at random. Subsequently, when the pulse is applied in Step (II), the grain boundaries are intensively and rapidly heated, and brought into a state where slips easily occur, whereby the transformation superplasticity appears. Subsequently, when the wire 11 is rapidly cooled in Step (III) under the tensile stress, superelastic deformation and superplastic deformation take place in the tensile direction. Then, when the $A_f$ point or thereabout is reached, the superelastic deformation sufficiently progresses, the crystals are sufficiently distorted, and further, the superelastic deformation takes place, whereby plastic strain is accumulated at the grain boundaries.

Subsequently, when Step (II) is performed again, the grain boundaries are intensively and rapidly heated again by the application of the pulse and brought into the state of the transformation superplasticity. At this time, the temperature does not rise much within the crystal grains, and the crystal grains are in the state of the superelasticity. At the grain boundaries which are brought into the state of the transformation superplasticity as described above, the slips easily occur, and the plastic strain accumulated during the cooling process and the residual stress field accompanied thereby are removed. Accordingly, the superelastic energy accumulated within the crystal grains is released from restraint, and the crystal grains are rotated by superelastic energy which works as a driving force in a direction in which the superelastic deformation can take place more easily (the superelastic deformation can take place most easily when the habit plane of the crystal makes an angle of 45 degrees to the stress).

It is believed that, as Steps (II) and (III) are repeated, the processes similar to the above are repeated, whereby the number of crystal grains orientated in the direction, in which the deformation due to the superelasticity can take place easily, is on the increase in terms of probability.

Incidentally, in this preferred embodiment, the load is applied in Step (II), however, no load or a very low load may be applied in Step (II). Even in this case, the phenomenon of the transformation superplasticity takes place due to the presence of the residual stress field.

In Step (I), as described above, the tendency is seen that the larger the crystal grain size is, the better becomes the shape stability of the material after completion of the treatment according to the present invention. This is believed to result from the fact that, as the size of crystal grain becomes larger, the material gets nearer to the state of single crystal and thereby, at a proper timing, the superplasticity becomes difficult to appear.

The manner of heating by current pulse in the present invention will hereunder be described further in detail. In the present invention, as described above, when the material to be treated is heated by current pulse, the grain boundaries are intensively heated so that good results can be obtained. Further, when the continuous pulses are applied to the shape memory alloy, the process in which the heat cycle passes through the transformation region can be repeated sufficiently, whereby good results can be obtained. And, in this case, the duty ratio of the pulse is preferably low. Still further, it is necessary to take care of the upper limit temperature of the heat cycle in connection with the duty ratio. The upper limit temperature may be the lowest temperature required to heat the grain boundaries intensively and rapidly to bring them into the state of the transformation superplasticity, causing the rotation of the crystal grains. The frequency of the pulse should be as high as possible, however, such excessively high frequency as to cause the surface layer current is not proper, since it heats only the surface layer of the material. In practice, the pulse frequency around scores KHz is usually preferable.

Figure 2:
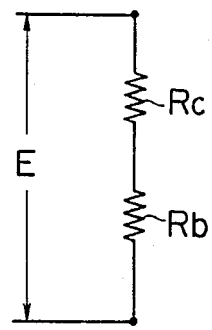
FIG. 2 is a model diagram showing electric resistances at the boundary and within the interior of crystal grain of the Ti-Ni shape memory alloy.

The heating by current pulse will hereunder be described in more detail utilizing a model. As described above, it is believed that, in the polycrystalline material the electric resistance rate is low within the crystal grain, while the electric resistance rate is fairly high at the grain boundaries and thereabound. In other words, the polycrystalline material is considered to be a material within which the crystal grains with low electric resistance are floating in the grain boundaries with high electric resistance. In the case where an electric potential is applied to the material of the above-described structure to heat it, a model of resistances in series as shown in FIG. 2 can be conceived. Now, if an electric resistance within the crystal grain is $R_c$, an electric resistance at the grain boundaries is $R_b$ and a voltage to be applied across the resistances is E, then, a heat quantity $H_c$ generated within the crystal grain and a heat quantity $H_b$ generated at the grain boundaries by application of one pulse having a pulse width $\Delta t$ sec will be represented by the following equations.

$$H_c = R_c \{E/(R_c+R_b)\}^2 \Delta t$$

$$H_b = R_b \{E/(R_c+R_b)\}^2 \Delta t$$

Accordingly, a difference in heat quantity between the grain boundary and the interior of the crystal grain is as follows:

$$H_c - H_b = E^2 \Delta t (R_b - R_c)/(R_c+R_b)^2$$

From this equation, it is clearly understood that, when E or $\Delta t$ at a large value, the difference in heat quantity between the grain boundary and the interior of the crystal grain can be larger, and consequently, so can be the difference in temperature therebetween. However, if $\Delta t$ is set at a large value, the heat quantity generated at the grain boundaries is diffused to the crystal grains during the heating process. In order to avoid this, it is necessary that the pulse width $\Delta t$ is set at a satisfactorily low value so that the adiabatic heating in which the application of the pulse is stopped before the heat is diffused. More specifically, if the OFF period in a cycle of the current pulse is sufficiently long in relation to $\Delta t$, then it becomes possible to intensively heat the grain boundaries and thereabound. The value of t is to be determined by the heat conductivity and the mean diameter of the crystal grains of the material, whereby, when the crystal grains are small in size or the heat conductivity of the material is high, the value of t should be set at a lower value.

Here, the heat cycle by the ON and OFF periods per cycle of the current pulse is called a micro-heat cycle, and the macro-heat cycle by the application and interruption of the current pulse is simply called a heat cycle. When the material is heated by continuous pulse, the successive mini-heat cycles constitute the heating process of the heat cycle. The heating process should be completed at a stage where heat accumulation progresses throughout the material and a necessary and sufficient temperature is reached, and then the heat cycle shifts to the cooling process.

It has been found that the Ti-Ni shape memory alloy treated according to the present invention exhibits the following characteristic properties.

(A) The Ti-Ni shape memory alloy treated according to the present invention has a good shape stability, and even if the alloy is caused to perform repeated operations accompanied by deformation of a large scale (about 4% in tension), the alloy does not easily lose the given configuration.

(B) Service life is sufficiently long for repetitive operations accompanied by deformation of a large scale (about 4% in tension).

(C) As compared with the Ti-Ni shape memory alloy treated by the conventional treatment, the Ti-Ni shape memory alloy treated according to the present invention does not easily lose the memory of the given configuration even when excessively heated to a higher temperature, and exhibits the similar tendency even under load.

(D) The material treated according to the present invention has the characteristic properties of easily operating in the direction of the treatment, i.e. the tensile direction. More specifically, the force required for deforming the alloy becomes very low as compared with the shape restoring force.

(E) The operating efficiency when the periodical motions are performed is good.

(F) In the material treated according to the present invention, the electric resistance value has a negative characteristic to the temperature over a wide range within a scope in which the shape restoration takes place. The variation of the electric resistance may reach as much as 30%. The general electric resistance rate in the material treated by the method according to the present invention is low as compared with that of the polycrystalline material in which crystal orientations are random.

(G) After the final process, on the outer surface of the material, many irregularities seemingly contoured by the crystal grains are observed.

(H) Within the scope where superelasticity is observed, variations in the physical properties due to the hysteresis of repeated deformations and the like is low, thus the properties are stable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of arranging the crystal orientation of a Ti-Ni shape memory alloy comprising the steps of:
   (a) heating a wire of the Ti-Ni shape memory alloy to a high temperature with a predetermined range to turn said alloy into a solid solution, and thereafter, cooling said wire, whereby plastic strain in said wire is removed and crystals of said alloy are grown;
   (b) passing current pulse through said wire to rapidly heat said wire to a temperature higher than its $M_f$ point to cause elongation due to transformation induced superplasticity to said wire;
   (c) stopping the application of the pulse, rapidly cooling said wire to the temperature of its $M_f$ point or below, applying tensile load immediately after the stop of the application of the pulse to cause elongation again in a cooling process of said wire, and removing or sufficiently decreasing said tensile load to stop the deformation when the value of m with regard to said wire is sharply decreased; and
   (d) repeating said steps (b) and (c) a required number of times.

2. A method of treating a Ti-Ni shape memory alloy as set forth in claim 1, wherein, in said step (b) said wire is heated to a temperature higher than its $M_d$ point.

3. A method of treating a Ti-Ni shape memory alloy as set forth in claim 1, wherein, in said step (b) the current pulse is passed through said wire under tensile load, and in said step (c) said tensile load is increased immediately after the stop of the application of the pulse.

4. The method of treating a Ti-Ni shape memory alloy as set forth in claim 1, wherein said shape memory alloy is adjusted in composition such that its $A_f$ point is 100° C. or above.

5. The method of treating a Ti-Ni shape memory alloy as set forth in claim 1, wherein, in Step (c) said material is rapidly cooled to the temperature of its $M_f$ point or below at a cooling rate of 20 to 100 K/s or higher.

* * * * *